United States Patent [19]

Stendel et al.

[11] 3,998,928
[45] Dec. 21, 1976

[54] PROCESS FOR CALCINING PELLET-SHAPED CALCIUM HYDROXIDE

[75] Inventors: Joachim Stendel, Hurth-Knapsack; Wilhelm Portz, Erftstadt Kierdorf; Georg Strauss, Erftstadt Lechenich; Heinrich Weiler, Hurth-Hermulheim; Gunther Moormann, Bruhl-Vochem; Horst Witt, Erftstadt Liblar, all of Germany

[73] Assignee: Hoechst Aktiengesellschaft, Frankfurt am Main, Germany

[22] Filed: Feb. 12, 1975

[21] Appl. No.: 549,175

[30] Foreign Application Priority Data

Feb. 16, 1974 Germany .......................... 2407506

[52] U.S. Cl. ............................. 423/155; 423/168; 423/175; 423/636
[51] Int. Cl.² ........................................ C01F 11/04
[58] Field of Search .......... 423/175, 177, 636, 637, 423/432, 155, 168

[56] References Cited

UNITED STATES PATENTS

| 1,315,952 | 9/1919 | Dwight et al. | 423/637 |
| 1,684,958 | 9/1928 | Hyde | 423/175 |
| 1,688,422 | 10/1928 | Hyde | 423/177 |
| 1,710,967 | 4/1929 | Crow | 423/637 |
| 2,923,539 | 2/1960 | Meyer | 423/637 |

Primary Examiner—Oscar R. Vertiz
Assistant Examiner—Wayne A. Langel
Attorney, Agent, or Firm—Connolly and Hutz

[57] ABSTRACT

Pellet-shaped calcium hydroxide forming part of the mixture of flux and ores in electrothermal calcium carbide furnaces is calcined. The pellets are made by granulating or briquetting moist calcium hydroxide, delivered to a sintering grate and conveyed thereon through a heating zone, wherein high temperatures are produced by the combustion of gas, above the grate, and wherein the combustion gas is exhausted, below the grate. The calcium hydroxide pellets are more especially placed on to the grate, covered with a layer of broken limestone and the undried pellets are directly conveyed through the heating zone, in an apparatus for carrying out the process.

15 Claims, 1 Drawing Figure

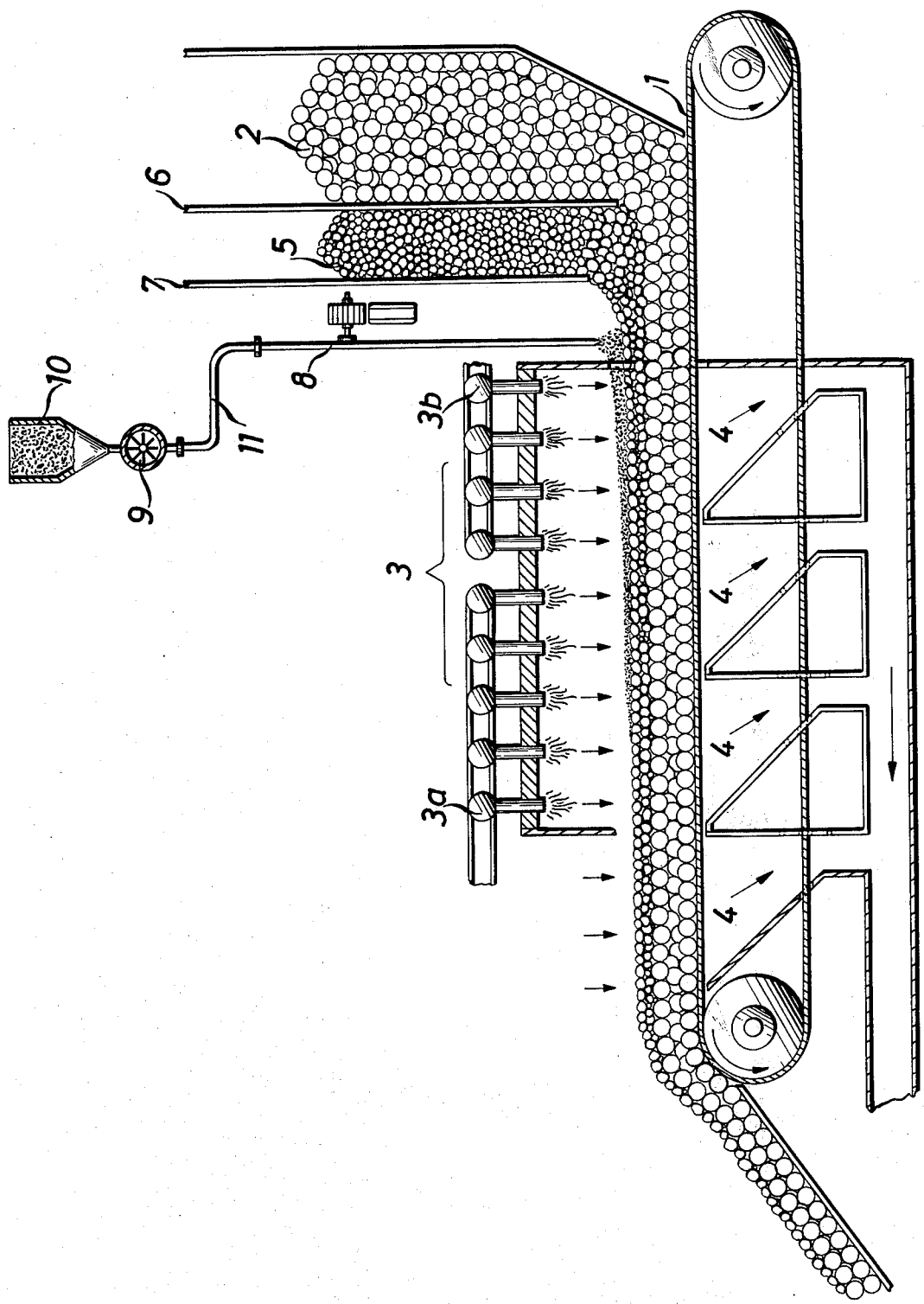

PROCESS FOR CALCINING PELLET-SHAPED CALCIUM HYDROXIDE

The present invention relates to a process and to an apparatus for calcining pellet-shaped calcium hydroxide forming part of the mixture of fluxes and ores (briefly termed burden hereinafter) in electrothermal calcium carbide furnaces, the pellets being produced by granulating or briquetting moist calcium hydroxide, being delivered on to a sintering grate, and being conveyed thereon through a heating zone, wherein high temperatures are produced by the combustion of gases, above the grate, and the combustion gases are exhausted, below the grate.

Calcium hydroxide produced by the reaction of calcium carbide with water to acteylene is preferable used.

The calcination of calcium hydroxide with recycle of the calcined material to the carbide production stage has already been described (R. H. Hall, The Engineering Journal, Dec. 1951, pages 1176–1182). Unless it is obtained as lumpy material, it is necessary for the calcium hydroxide to be granulated or briquetted. Calcium hydroxide which is to be shaped normally contains between 10 and 25% of water, which is not chemically combined therewith.

It has also been reported that impurities, especially $SiO_2$ and $Al_2O_3$, which originate from the carbide raw material, concentrate in shaped calcium hydroxide.

While calcium hydroxide pellets are commonly calcined in rotary kilns, it has been proposed to use a suction draught sintering grate.

It is possible for the calcination to be effected with the use of solid or gaseous fuels, e.g. coke plant or carbide furnace gas, the absorption of $CO_2$ by the pellet-shaped material being controlled or inhibited.

The above prior processes are, however, not fully satisfactory in various respects. For example, it is necessary for the calcium hydroxide to be purified so as to avoid agglomeration of the individual hydroxide shapes during the calcination and the consequential adverse effects on the permeability to gas of the shapes, and on the reactivity of the resulting lime. In addition to this, prior to calcining the moist shapes, it is necessary for them to be dried with care to avoid bursting during the calcination. Needless to say these are steps which do not add to the efficiency of the above prior art processes.

We have now unexpectedly found that pellet-shaped calcium hydroxide can be calcined with improved space/time-yields by a process which provides for the shaped calcium hydroxide to be temporarily and superficially carbonized, in constrast with the prior art methods, wherein attempts are made to avoid carbonization.

To this end, the invention provides for the shaped calcium hydroxide to be placed on to a grate, to be covered with a layer of broken limestone and for the undried shapes to be directly conveyed through the heating zone.

The shapes so covered with broken limestone should more preferably be conveyed through the heating zone at the speed necessary to have decarbonized limestone and dehydrated calcium hydroxide, at the discharge end of the heating zone.

It is also advantageous for the calcium hydroxide to be used in the form of spheroidal or ellipsoidal material and for the limestone-covered layer of shaped material to undergo calcination on the grate to have a height which is selected in accordance with the size of the shapes. More particularly, the shaped material should be used in layers having a height within the range 0.3 and 0.4 m, 0.4 and 0.5 m and 0.5 and 0.6 m, respectively, for shape volumes within the range 10 and 20 cc, 20 and 30 cc, and 30 and 40 cc, respectively. With respect to the broken limestone, it is advantageous for it to be used in the form of particles having a diameter within the range 10 and 30 mm, the particle size being preferably conformed to the size of the shaped calcium hydroxide. The layer of broken limestone should conveniently have a height forming up to 50% of the total bed (shaped calcium hydroxide and limestone). Limestone containing at least 95% of $CaCO_3$ should most conveniently be used. It is also advantageous to provide for temperatures within the range 1000° and 1200° C in the heating zone, above the material which is to undergo calcination. The temperatures prevailing in the head end third of the heating zone should be maintained at a level equal to at least 90% of the temperature prevailing in the tail end third of that zone.

The heating zone is conveniently subdivided into two zone portions being heated separately from one another, the head end portion being heated in an atmosphere having more $CO_2$ therein than the atmosphere prevailing in the tail end portion. The atmosphere prevailing in the tail end portion is more particularly produced by the combustion of hydrogen or gases enriched with hydrogen. The fuels subjected to combustion in the head end portion should preferably be selected from carbonaceous gases or solid carbonaceous fuels, which are distributed over, or from liquid fuels, which are sprayed on to, the material to undergo calcination. The travelling speed of the grate and the supply of oxygen, on the one hand, and the quantity and particle size of solid fuel or the quantity of liquid fuel, on the other hand, should be so balanced against each other that the solid or liquid fuel undergoes combustion in the zone portion being heated with gas rich in carbon. The prefered carbonaceous gas is carbide furnace gas, the preferred solid fuels include coal, coke or petroleum coke having a size within the range 1 and 6 mm, and the preferred liquid fuel is fuel oil. It is good practice for hydrogen, natural gas, light hydrocarbons or a mixture of hydrogen and carbide furnace gas to be subjected to combustion in the tail end portion of the heating zone.

A further advantageous embodiment of the present process comprises establishing a temperature within the range 1000° and 1200° C in the entire heating zone, above the layer of broken limestone therein, and so balancing against each other (a) the bed heights of shaped calcium hydroxide and broken limestone, (b) the quantities of gas exhausted below the grate, and (c) the travelling speed of the grate that the gas exhausted below the grate has a mean temperature within the range 300° and 400° C.

The hot gas exhausted below the grate can be used for the drying of moist coke forming part of the burden.

The invention also provides an apparatus for carrying out the present process, such as that shown diagrammatically in the accompanying drawing.

As can be seen, the apparatus comprises a movable suction draught grate 1; a chute 2 being placed above the grate 1 and delivering a bed of shaped calcium hydroxide thereonto; a burner 3 being placed downstream, seen in the direction of motion of the grate, of the chute 2 and being directed against the upper side of the grate 1; a gas exhauster 4 being positioned below, within the region of, the burner 3; a further chute 5 delivering a bed of broken limestone to the grate 1 and being positioned between the chute 2 and the burner 3; the two chutes being arranged so as to permit the height of the bed of the shaped calcium hydroxide and the height of the bed of limestone on the grate 1, to be varied independently from one another.

It is advantageous for the chutes 2 and 5 to be provided with slides 6 and 7, respectively, terminating above the sintering grate 1 so as to be spaced therefrom, the spacings between the grate and the two slides being variable independently from one another.

It is also advantageous for the burner 3 to be subdivided into two independent burner systems 3a and 3b, each of the two systems having a separate fuel inlet. In accordance with a further embodiment of the present invention, a tubular element 8 supplying particulate fuel to the layer of broken limestone is arranged between the chute 5 and the burner 3, the tubular element being adapted to move to-and-fro transversely with respect to the grate 1, and communicating through a flexible hose 11 and a bucket wheel 9 with a particulate fuel reservoir 10.

The present invention has unexpectedly been found to produce a stabilizing effect making it substantially impossible for the moist material to burst during calcination and thereby to become less permeable to gas, whereby the supply of the heat necessary for the calcination of the material would be rendered difficult. In other words, it is not necessary for the material to be predried. As a result, it is possible, even in the head end portion of the heating zone, to produce high gas temperatures, above the grate. Higher temperatures prevail in the tail end portion of the heating zone, wherein the superficially carbonized material is decarbonized in contact with the combustion gases having free access thereto, especially when the atmosphere prevailing in the tail end portion of the zone contains little, or is free from $CO_2$.

As a result of the good permeability to gas of the shaped material, it is possible for the heat to be homogeneously distributed therein and for the shaped material to be kept free from phenomena, such as local superheating or agglomeration. The invention also provides for the intake, along a cooling path downstream of the heating zone, of sufficient cooling air so that the calcined material coming from the grate has a temperature of 150° C.

There is a further reason why the bed of broken limestone covering the calcium hydroxide acts as a protective layer. For as long as $CaCO_3$ is decarbonized, superheating is substantially avoided by an endothermal reaction which takes place at temperatures within the range 750° and 850° C while $CO_2$ is liberated. The $CO_2$ liberated penetrates into the bed of shaped calcium hydroxide, initiates an exothermal reaction and expels chemically combined water therefrom. This is a heat distributing mechanism, which permits the bed of material to be rapidly heated in the head end portion of the heating zone and which combines with the superficial stabilizing carbonization of the shaped material. In other words, the shaped material is not likely to burst, decompose or agglomerate, even if heated at higher temperatures. The shaped material remains in the state of loosely aggregated material well permeable to gas.

The present invention provides for an optimum throughput of gas, for an optimum supply of heat, and for an optimum space/time-yield at temperatures within the range 1000° and 1100° C, which are the maximum temperatures allowable for the combustion gases contacting the material to undergo calcination so as to avoid agglomeration of the shaped material on the grate, whereby it would be rendered less permeable to gas, and to avoid sintering of the calcined material, whereby its reactiviy would be impaired.

In those cases in which material readily permeable to gas is concerned, it is possible for it to be used in somewhat thicker layers. This means longer sojourn times and improved utilization of the calorific energy. The desirable reversible carbonization effect can be further intensified and fuel gas energy can be replaced by solid fuel energy by depositing, for example, coke or petroleum coke particles having a size within the range 1 and 6 mm on the covering layer of broken limestone. It is convenient for the coke to be used in the quantity and particle size necessary to ensure combustion thereof, in the head portion of the heating zone being heated with carbonaceous gas. In this manner it is possible to use up to 5% of coke particles, based on the quantity of calcined material produced, and to generate up to 50% of the heating energy necessary with the use of solid fuels.

The advantageous effects produced by subdividing the burner into two independent burner systems is best represented by the increase in performance obtained therewith.

In those cases in which the entire heating zone is heated with hydrogen, the shaped material conveyed therethrough in the form of a relatively thin layer is found to agglomerate. In other words, only little gas can be forced to travel through the layer at low gas temperatures above the grate, limiting the production of calcined material to 3.0 metric tons/h. In this case, partially glowing calcined material is even delivered to the cooling zone.

The same heating zone, save that it is subdivided into a head end portion heated by means of carbide furnace gas, and into a tail end portion heated by means of hydrogen, enables 7.4 metric tons/h of calcined material to be produced in otherwise the same apparatus.

It use is made of a covering layer of broken limestone, which enables establishing, in the head end portion of the heating zone, above the layer, a temperature approaching that which prevails in the tail end portion, it is possible to further increase the production capacity to 14.8 metric tons/h of calcined material.

Similar results are obtained if the carbide furnace gas used in the head end portion of the heating zone is partially replaced by coke particles.

The following Example illustrates the beneficial effects of the present invention.

EXAMPLE

The suction draught sintering grate was 1.5 m wide. The heating zone had a length of 8.0 m and the cooling zone had a length of 3.5 m. The calcium hydroxide pellets were substantially ellipsoidal and had a mean volume of 28 cc. The broken limestone had a diameter within the range 18 and 25 mm.

Table

Experiment

Table-continued

| Conditions: | 1<br>H₂ heating Gas in entire calcin.zone | 2<br>Carbide furnace gas in head end portion, and H₂ in tail end portion, of calcin.zone | 3<br>Covering layer of broken limestone in Exp. 2 | 4<br>Coke particles in Exp. 3 |
|---|---|---|---|---|
| Heating | | | | |
| Carbide furnace gas (m³/h) | — | 1 200 | 2 500 | 2 300 |
| Hydrogen (m³/h) | 970 | 1 000 | 2 000 | 1 750 |
| Coke particles (% based on calcined material) | — | — | — | 1 |
| Combustion gas (m³/h) | 14 500 | 30 000 | 41 000 | 41 000 |
| Energy yield (%) | 57 | 71 | 70.4 | 69 |
| Grate | | | | |
| Travelling speed (m/h) | 9.2 | 21 | 40 | 38 |
| Bed height of shaped material(m) | 0.3 | 0.4 | 0.4 | 0.4 |
| Bed height of broken limestone(m) | — | — | 0.1 | 0.1 |
| Pressure difference (mm water) above and below grate | 140 | 130 | 100 | 110 |
| Calcinate production (tons/h) | 3.0 | 7.4 | 14.8 | 14.0 |
| CaO-content (%) | 89.0 | 88.0 | 90.0 | 91.0 |

| | | below grate | above grate | below grate | above grate | below grate | above grate | below grate | above grate |
|---|---|---|---|---|---|---|---|---|---|
| Temperature (° C) | | | | | | | | | |
| Measuring point | 1 | 80 | 190 | 110 | 950 | 150 | 1000 | 130 | 980 |
| | 2 | 120 | 260 | 180 | 430 | 170 | 1040 | 170 | 1000 |
| | 3 | 140 | 350 | 210 | 600 | 175 | 1080 | 200 | 1100 |
| | 4 | 250 | 570 | 280 | 830 | 315 | 1110 | 400 | 1150 |
| | 5 | 350 | 800 | 370 | 930 | 400 | 1140 | 430 | 1140 |
| | 6 | 380 | 910 | 450 | 950 | 460 | 1140 | 450 | 1130 |
| | 7 | 420 | 950 | 460 | 960 | 500 | 1130 | 460 | 1130 |
| | 8 | 400 | 980 | 460 | 960 | 525 | 1110 | 470 | 1120 |

We claim:

1. A process for calcining pellet-shaped calcium hydroxide forming part of the mixture of flux and ores in electrothermal calcium carbide furnces, the pellets being made by granulating or briquetting moist calcium hydroxide, being delivered to a sintering grate and being conveyed thereon through a heating zone, wherein high temperatures are produced by the combustion of gas, above the grate, and wherein the combustion gas is exhausted, below the grate, which process comprises placing calcium hydroxide pellets containing between about 10 to 25% by weight of free water on to the grate, convering them with a layer of broken limestone and directly conveying the undried pellets through the heating zone to effect a temporary and superficial carbonization of the calcium hydroxide so as to have decarbonized limestone and dehydrated calcium hydroxide at the discharge end of the heating zone.

2. The process as claimed in claim 1, wherein the calcium hydroxide pellets are used in the form of spheroidal or ellipsoidal material and the limestone-covered layer of the calcium hydroxide pellets has a height within the range 0.3 and 0.4 m, 0.4 and 0.5 m and 0.5 and 0.6 m, respectively, for a shape volume within the range 10 and 20 cc, 20 and 30 cc and 30 and 40 cc, respectively.

3. The process as claimed in claim 1, wherein the broken limestone has a particle size within the range 10 and 30 mm, corresponding to the particle size of the pellet-shaped calcium hydroxide.

4. The process as claimed in claim 1, wherein the bed of broken limestone has a height equal to up to 50% of the total layer of pellet-shaped calcium hydroxide and limestone.

5. The process as claimed in claim 1, wherein the limestone contains at least 95% of $CaCO_3$.

6. The process as claimed in claim 1, wherein temperatures within the range 1000° and 1200° C are established in the heating zone, above the material to undergo calcination.

7. The process as claimed in claim 6, wherein the temperatures prevailing in the head end third of the heating zone are maintained at a level equal to at least 90% of the temperature prevailing in the tail end third of that zone.

8. The process as claimed in claim 1, wherein the heating zone is subdivided into two zone portions being heated separately from one another, the head end portion being heated in an atmosphere having more $CO_2$ therein than the atmosphere prevailing in the tail end portion and being produced by the combustion of hydrogen or gas enriched with hydrogen.

9. The process as claimed in claim 8, wherein the atmosphere prevailing in the head end portion of the heating zone is produced by the combustion of carbonaceous gases or by the combustion of solid carbonaceous or liquid fuels, the solid fuels being distributed over, and the liquid fuels being sprayed on to, the material to undergo calcination.

10. The process as claimed in claim 9, wherein the travelling speed of the grate and the supply of oxygen, on the one hand, and the quantity and particle size of solid fuel or the quantity of liquid fuel, on the other hand, are so balanced against each other that the solid or liquid fuel undergoes combustion in the zone portion being heated with gas rich in carbon.

11. The process as claimed in claim 10, wherein the solid fuel is used in the form of particles having a size within the range 1 and 6 mm.

12. The process as claimed in claim 9, wherein the carbonaceous gas is carbide furnace gas, the solid fuel is coal, coke or petroleum coke, and the liquid fuel is fuel oil.

13. The process as claimed in claim 8, wherein hydrogen, natural gas, light hydrocarbons or a mixture of hydrogen and carbide furnace gas is subjected to combustion in the tail end portion of the heating zone.

14. The process as claimed in claim 1, wherein a temperature within the range 1000° and 1200° C is established in the entire heating zone, above the layer of broken limestone and (a) the bed height of the pellet-shaped calcium hydroxide and broken limestone, (b) the quantities of gas exhausted below the grate, and (c) the travelling speed of the grate are so balanced against each other that the gas exhausted below the grate has a mean temperature within the range 300° and 400° C.

15. The process as claimed in claim 1, wherein the hot gas exhausted below the grate is used for the drying of moist coke forming part of the mixture of fluxes and ores.

* * * * *